US008798609B2

(12) United States Patent
Jeon et al.

(10) Patent No.: US 8,798,609 B2
(45) Date of Patent: Aug. 5, 2014

(54) USER INTERFACE FOR SUPPORTING CALL FUNCTION AND PORTABLE DEVICE USING THE SAME

(75) Inventors: Jae Choon Jeon, Gyeongsangbuk-do (KR); Yun Hyang Kim, Gyeongsangbuk-do (KR); Jin Gu Lee, Daegu Metropolitan (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 541 days.

(21) Appl. No.: 12/706,138

(22) Filed: Feb. 16, 2010

(65) Prior Publication Data
US 2010/0216448 A1 Aug. 26, 2010

(30) Foreign Application Priority Data

Feb. 26, 2009 (KR) ........................ 10-2009-0016289

(51) Int. Cl.
H04M 3/00 (2006.01)
H04M 3/42 (2006.01)
H04M 1/64 (2006.01)
H04M 11/00 (2006.01)

(52) U.S. Cl.
USPC ........ 455/418; 455/415; 455/416; 379/88.11; 379/93.17

(58) Field of Classification Search
USPC ........ 455/415, 416, 414.1–417, 556.1–556.2, 455/566; 379/93.21, 158, 202.01–205.01, 379/242, 345
See application file for complete search history.

(56) References Cited

U.S. PATENT DOCUMENTS

| 5,533,110 | A | * | 7/1996 | Pinard et al. | 379/355.01 |
|---|---|---|---|---|---|
| 5,923,737 | A | * | 7/1999 | Weishut et al. | 379/93.17 |
| 6,020,916 | A | * | 2/2000 | Gerszberg et al. | 348/14.07 |
| 6,075,851 | A | * | 6/2000 | Pinard et al. | 379/199 |
| 6,278,454 | B1 | * | 8/2001 | Krishnan | 715/846 |
| 6,415,020 | B1 | * | 7/2002 | Pinard et al. | 379/88.11 |
| 6,594,688 | B2 | * | 7/2003 | Ludwig et al. | 709/204 |
| 6,675,194 | B1 | * | 1/2004 | Pinard et al. | 709/202 |
| 6,816,589 | B2 | * | 11/2004 | Pinard | 379/265.01 |
| 7,072,450 | B1 | * | 7/2006 | Pinard | 379/88.11 |
| 7,765,257 | B2 | * | 7/2010 | Chen et al. | 709/204 |
| 7,974,609 | B2 | * | 7/2011 | Lee et al. | 455/415 |
| 8,199,899 | B2 | * | 6/2012 | Rogers et al. | 379/265.01 |
| 2004/0107253 | A1 | * | 6/2004 | Ludwig et al. | 709/204 |
| 2004/0107254 | A1 | * | 6/2004 | Ludwig et al. | 709/204 |
| 2007/0280464 | A1 | * | 12/2007 | Hughes et al. | 379/205.01 |
| 2010/0167710 | A1 | * | 7/2010 | Alhainen | 455/416 |
| 2010/0311396 | A1 | * | 12/2010 | Kim et al. | 455/414.1 |
| 2012/0229591 | A1 | * | 9/2012 | Lee | 348/14.08 |
| 2012/0327173 | A1 | * | 12/2012 | Couse et al. | 348/14.03 |

* cited by examiner

Primary Examiner — Dwayne Bost
Assistant Examiner — Scott Trandai
(74) Attorney, Agent, or Firm — Cha & Reiter, LLC

(57) ABSTRACT

Disclosed is a user interface for supporting a call function and a portable device using the user interface. With respect to a portable device having a call function, icons are allocated to telephone numbers of devices or indexes corresponding thereto and are displayed on a display unit, and a touch sensor setting is performed to support generation of a touch event with respect to icons output on the display unit, so that various call functions are supported through movement, disposition and removal of the icons.

16 Claims, 6 Drawing Sheets

FIG. 4
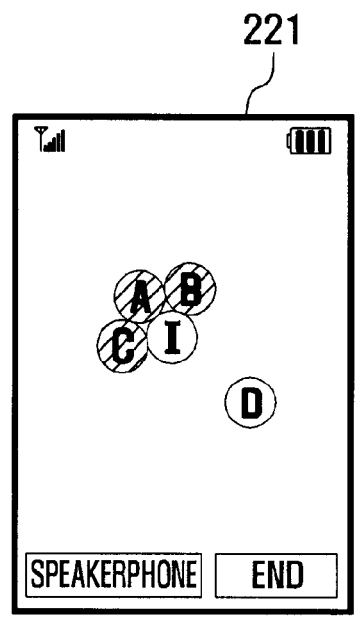
CALL ALTERNATION
ACCORDING TO TOGGLE
D: hold
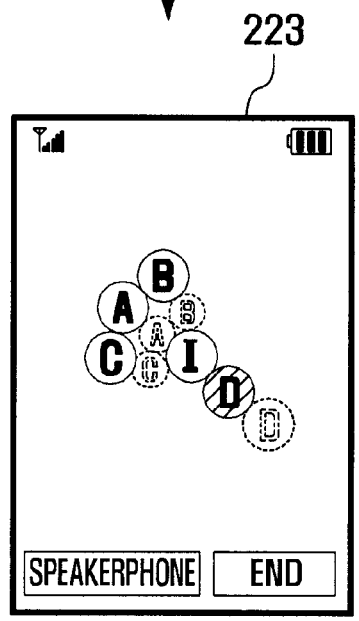
CALL ALTERNATION ACCORDING TO TOGGLE

USER INTERFACE FOR SUPPORTING CALL FUNCTION AND PORTABLE DEVICE USING THE SAME

CLAIM OF PRIORITY

This application claims priority to and the benefit of Korean Patent Application No. 10-2009-0016289 filed in the Korean Intellectual Property Office on Feb. 26, 2009, the entire contents of which are incorporated herein by reference.

BACKGROUND OF THE INVENTION

1. Field of the Invention

The present invention relates to a portable device having a call function, and more particularly to a user interface for providing an icon for a counterpart index in order to support a call function, mapping a touch sensor to the icon, and then supporting various functions for a call according to movement, disposition, and removal of the icon, and a portable device employing the user interface.

2. Description of the Related Art

Recently, with the rapid development of communication technology, portable devices include more and more functions, and accordingly, more and more various user interfaces (UIs) and various functions using the UIs are being provided. For example, in order to support a file reproduction function for a music file, a moving picture file, etc., the portable device includes a user interface for supporting only a corresponding set of functions. In addition, in order to support a file search function, the portable device includes a user interface to display a search window and various contents obtained through a search.

However, with respect to call functions, i.e. a call connection function, a call termination function, a call waiting function, etc., the conventional portable device includes a user interface which supports only simple information about the call functions. That is, each user interface included in the conventional portable device provides only one function selected, for example, from among a function of displaying numerals and a function of displaying phonebook information according to an input signal received from an input unit accepting a user's input, a function of presenting that a call is being connected to another portable device having a corresponding number, and a function of displaying a screen corresponding to a call termination when the call is terminated.

SUMMARY OF THE INVENTION

Accordingly, the present invention provides a user interface for supporting a plurality of call functions so as to more conveniently use the call functions by enabling the call functions to be controlled in a single interface when the call functions are used, and a portable device using the user interface.

In an exemplary embodiment the user interface comprises outputting icons, the icons comprising: a first icon corresponding to a portable device; and at least one second icon which corresponds to either at least one other device's telephone number input to the portable device or an index corresponding thereto, and to a telephone number or index of at least one other device in a state selected from the group of states consisting of a call-connecting state to the portable device and a call-connected state with the portable device.

In an exemplary embodiment of the present invention, there is provided a portable device for supporting a call function, the portable device comprising: a radio frequency unit for performing a call connection between a plurality of devices; an input unit for inputting a telephone number corresponding to another device, the input unit making a call connection through the radio frequency unit, and generating an input signal to select information stored in a phone book stored on the portable device about another device; a display unit for outputting a first icon corresponding to the portable device itself, and outputting at least one second icon selected from (1) one of at least one other device's telephone number corresponding to the input signal and an index corresponding thereto, and (2) one of a telephone number or index of at least one other device in a state selected from the group consisting of a call-connecting state and a call-connected state; a storage unit for storing images corresponding to the first icon and second icon, and the phone book information; a touch sensor unit for generating a touch event for movement, disposition, and removal thereof when any of the first icon and the second icon are touched; and a controller for controlling the call connection according to a distance between the first icon and the second icon, the distance being in units of measure of the display unit screen.

BRIEF DESCRIPTION OF THE DRAWINGS

The above features and advantages of the present invention will be more apparent from the following detailed description in conjunction with the accompanying drawings, in which:

FIG. 4 is a view illustrating a screen for explaining a toggle function upon a call according to an exemplary embodiment of the present invention;

DETAILED DESCRIPTION OF THE INVENTION

Hereinafter, exemplary embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

While the present invention may be embodied in many different forms, specific embodiments of the present invention are shown in the accompanying drawings and are described herein in detail, with the understanding that the present disclosure is to be considered as an exemplification of the principles of the invention and is not intended to limit the invention to the specific embodiments illustrated.

Hereinafter, the configuration of a user interface comprising an enhanced call function and a portable device comprising the user interface according to exemplary embodiments of the present invention will be described with reference to the accompanying drawings. However, it should be noted that the portable device of the present invention is not limited to embodiments described below, and the present invention can be applied to various embodiments in addition to the following embodiments.

Figure 1:
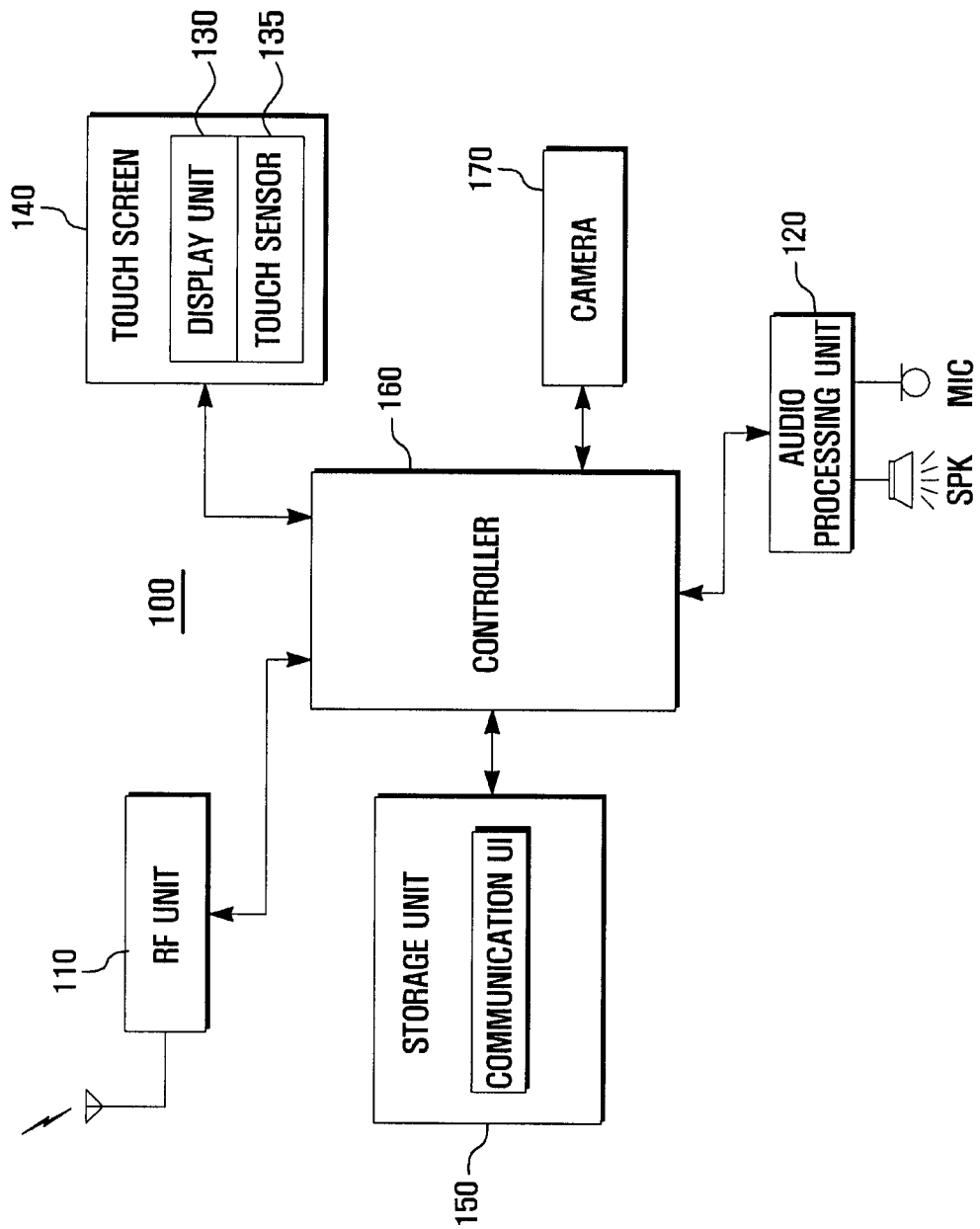
FIG. 1 is a block diagram schematically illustrating a configuration of a portable device according to an exemplary embodiment of the present invention.

FIG. 1 is a block diagram schematically illustrating a configuration of a portable device 100 according to an exemplary embodiment of the present invention.

Referring to FIG. 1, the portable device 100 includes a radio frequency unit 110, an audio processing unit 120, a display unit 130, a touch screen 140 including a touch sensor unit 135, a storage unit 150, and a controller 160. In addition, the portable device 100 may further include a camera 170.

The portable device 100 comprising the aforementioned configuration according to an exemplary embodiment of the present invention, upon performing a call function, controls one of the portable device 100 itself and a counterpart's telephone number or indexes corresponding to them to be displayed as icons, and allocates a touch map to the icons so that a function corresponding to the call function can be performed, thereby enabling the call function to be more rapidly and conveniently performed according to movement, disposition, and removal of the displayed icons. Hereinafter, the configuration of each component comprising the portable device 100 will be described in detail.

The radio frequency unit 110 transmits and receives signals, related to any of a portable device communication, a Short Message Service (SMS) and a Multimedia Message Service (MMS), data communication, to and from other devices including other portable devices. In addition, the radio frequency unit 110 converts each of voice/audio data and control data into RF signals and transmits the RF signals. The RF communication unit 160 also receives RF signals from other devices including other portable devices, converts each of the received RF signals into corresponding voice/audio data and control data, and outputs the converted corresponding voice/audio data and control data. To this end, the radio frequency unit 110 includes an RF transmitter for up-converting the frequency of signals to be transmitted and amplifying the up-converted signals, an RF receiver for low-noise amplifying received RF signals and down-converting the frequency of the amplified RF signals, etc. Particularly, the radio frequency unit 110 according to an exemplary embodiment of the present invention can form communication channels with a plurality of other devices in combination so as to perform a conference call with the other devices according to the control of the user.

The audio processing unit 120 further includes a speaker SPK for reproducing audio signals received from the portable device 100, and a microphone MIC for collecting audio signals, for example, voice signals of the user of the portable device 100. Particularly, the audio processing unit 120 is configured to output audio signals transferred from a plurality of other devices when performing a conference call with the other devices. In addition, when the portable device 100 performs a function on a file, such as a reproduction function, the audio processing unit 120 can output audio signals included in the file according to the control of the user.

The touch screen 140 includes the display unit 130 and the touch sensor unit 135. The touch screen 140 is configured to output a specific image or text information to the display unit 130, to allocate a touch map to the output image or text information so as to output information linked to the image or text according to a user's touch, respectively. That is, the touch screen 140 generates a plurality of touch events according to a user's touch applied on the touch sensor unit 135, and transfers each of the generated touch events to the controller 160. The plurality of generated touch events generated by the touch screen 140 includes a touch-down signal generated when the user touches one of a finger or a specified object to a screen provided in the display unit 130, a touch-drag signal generated when the user moves the finger or the specified object to a predetermined area at predetermined speeds in predetermined directions on the surface of the screen in a touch-down state, a touch-up signal generated when a touch is released from a specific position, and a double-touch signal. Particularly, the touch screen 140, according to an exemplary embodiment of the present invention, sets the touch sensor unit 135 to output information necessary for a call function in the form of at least one icon image of output being through the display unit 130, and to generate a required touch event when a specific icon image is touched. Consequently, each of the plurality of generated touch events corresponds to an input signal related to the performance of a call function, and the portable device 100 can perform a call function according to the generated touch events.

The display unit 130 displays various screen images including, for example, an idle screen image, a screen image corresponding to a content selected from among a plurality of contents stored in the storage unit 150, a screen image corresponding to user data, and an additional function screen image, in accordance with the use of the portable device 100. In an exemplary embodiment the display unit 130 is embodied with one of a Liquid Crystal Display (LCD), and an Organic Light Emitting Diode (OLED). Particularly, according to an exemplary embodiment of the present invention, the display unit 130 outputs include a first icon corresponding to the portable device itself, and at least one second icon corresponding to the telephone number of at least one other device, an index number stored in a phone book, and other icons defining various functions necessary for a call function. In addition, the display unit 130 provides a user interface to move, dispose, and remove the aforementioned icons. A user interface based on the touch screen 140 and display unit 130 will be described later in more detail with reference to the accompanying drawings.

The data stored in the storage unit 150 includes an operating system (OS) for booting the portable device 100, and at least one application program necessary for each function of the portable device 100, for example, a file reproduction function, a camera function when the portable device 100 includes the camera 170, a broadcast viewing function when the portable device 100 includes a broadcast receiving module. In addition, the data stored in the storage unit 150 further includes user data generated according to the use of the portable zo device, phone book information, and data received through a communication channel. To this end, the storage unit 150 includes at least one of a program memory and a data memory. Particularly, according to an exemplary embodiment of the present invention, the storage unit 150 stores a communication user interface (UI) and a touch map for supporting a call function, and an application program set to closely connect various call functions according to activation of a user interface output on the display unit 130.

In an exemplary embodiment of the present invention, the program memory further includes the aforementioned operating system and a touch screen operating program. In addition, the program memory stores application programs including, for example, a message writing/transmitting program, an application program for operating the camera, to be activated according to an input signal which is generated in response to activation of the touch screen operating program. Particularly, according to an exemplary embodiment of the present invention, the program memory stores a call function operating program based on the radio frequency unit 110. The call function operating program, when a telephone number or index of another device is input, performs a control operation to map a first icon corresponding to the portable device 100 itself and a second icon preset to correspond to the other device based on their respective stored images, and to output the first icon and the second icon, respectively, to the display unit 130. In addition, the call function operating program enables each icon to move according to a user's touch, and performs a control operation so that the touch sensor unit 135 can be set to generate an input signal for performing a specific call function according to at least one of proximity of icons displayed on the display unit 130, contact of icons displayed on the display unit 130, and overlap among icons displayed on the display unit 130. The second icon may include a plurality of icons according to a call connection state.

In an exemplary embodiment of the present invention, the data memory store includes data generated while any of the stored programs are being executed, user data input by the user, phone book data, image data collected though the camera, and message data transmitted and received through the radio frequency unit 110. Particularly, according to an exemplary embodiment of the present invention, the data memory store includes icon images corresponding to the telephone numbers of at least one other device, icon images corresponding to indexes stored for phone book data, an icon image representing the portable device 100 itself, and icon images corresponding with calling necessary for a call function, call termination, and data transmission. In addition, the data memory store provides the stored icon images to the controller 160 when the call function operating program is executed.

In an exemplary embodiment of the present invention, the camera 170 collects an image of a subject according to the control of the user. The camera 170 captures an image as an analog video signal through a lens. The camera 170 includes a camera sensor (not shown) for converting a captured optical signal to an electrical signal and a signal processor (not shown) for converting the analog video signal obtained through the camera sensor into digital data. In an exemplary embodiment the camera sensor includes a Charge Coupled Device (CCD) sensor and the signal processor includes a Digital Signal Processor (DSP), to which the present invention is not limited. Particularly, in an exemplary embodiment of the present invention when the user activates a video call function, the camera 170 performs a control operation to collect and transmit a corresponding user image to another device. The image collected by the camera 170 is displayed as a preview screen on the display unit 130, and an image received from another device is displayed on the display unit 130, together with the image collected by the camera 170. In this case, on the image collected by the camera 170 and the received image, icon images activated by the call function operating program are one of overlayed and output or output individually. In the case that the icon images are overlayed, in a further exemplary embodiment the icon images are output as translucent images or transparent images so that the user can identify the displayed images.

The controller 160 controls the overall operation of the portable device, and controls signaling between blocks of the portable device, e.g., 110 and 160, 140 and 160. The controller 160 can control the call function operating program stored in the storage unit 150 to be activated according to an input signal generated by the user, and control the icon images stored in the data memory to be displayed by the display unit 130. In addition, the controller 160 can set the touch sensor unit 135 so that the user can move icon images displayed on the display unit 130, and the controller 160 can perform a control operation to perform a call function connected with overlap, movement, disposition, and removal of each icon image according to an input by the user. The function of the controller 160 will be described later in more detail with reference to the accompanying drawings.

Figure 2:
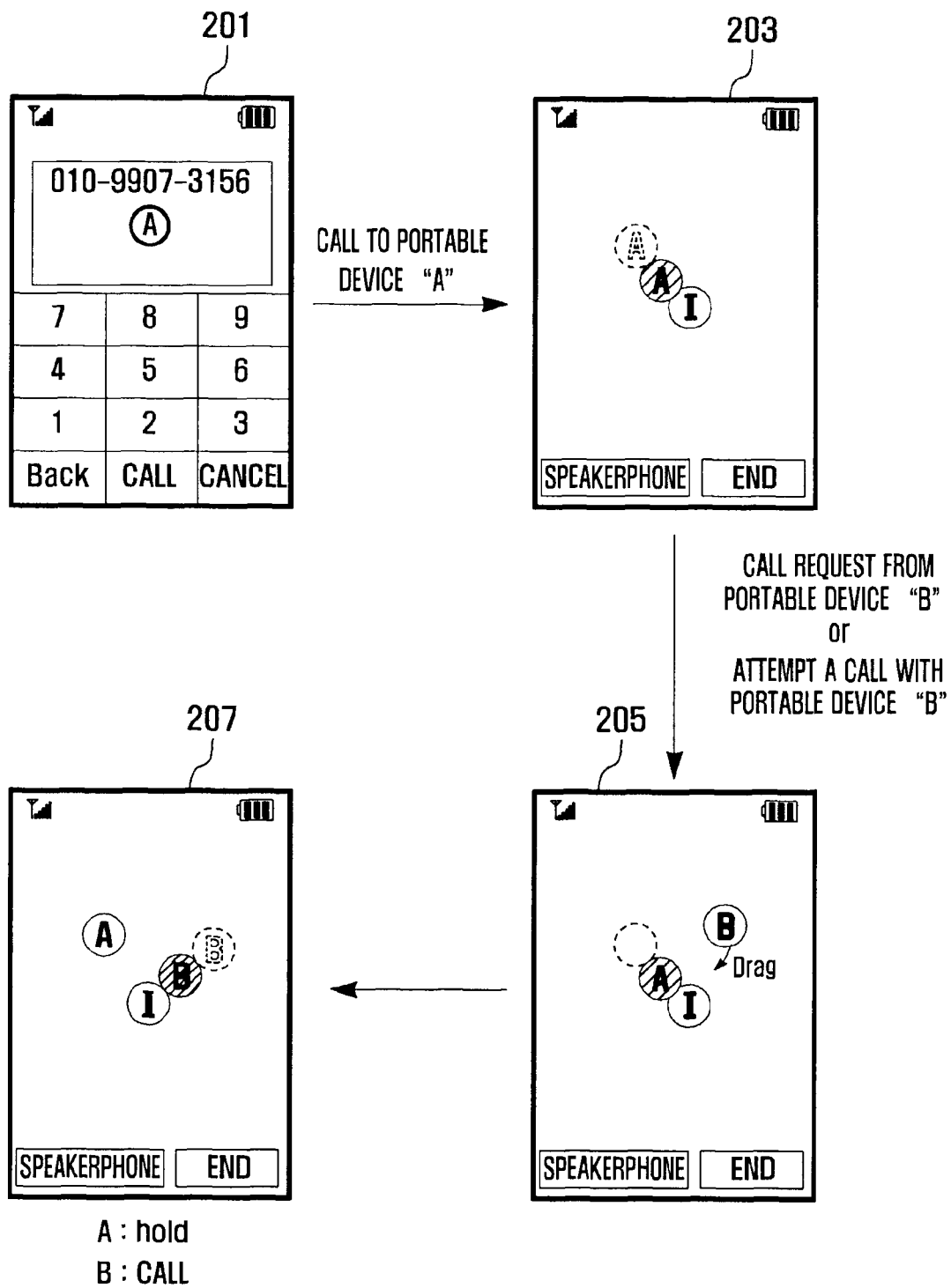
FIG. 2 is a view illustrating a screen for explaining a call request and hold function according to an exemplary embodiment of the present invention.

FIG. 2 is a view illustrating a user interface for performing a call function for call connection and hold shift according to an exemplary embodiment of the present invention.

First of all, although the following description is given on touching and dragging an icon in order to provide the functions of moving, removing, and disposing the icon at a specific position the present invention is not limited thereto. That is, according to an exemplary embodiment of the present invention, when the user of a portable device touches, double-touches, or flicks an icon in a specific direction, the functions of moving the icon to a predetermined position, disposing the icon at a specific position, or removing the icon are provided.

Referring to FIG. 2, when the user of the portable device inputs a telephone number, e.g. 010-9907-3156, of another device through the use of a keypad-type input unit, or selects index "A" corresponding to another device from data stored in a phone book stored in the storage unit 150, the display unit outputs the input telephone number of the selected index, as shown in a screen 201. In this case, when the display unit is implemented with a touch screen, a key map corresponding to the keypad is output on the display unit, and a touch sensor unit is set to generate touch events of the key map. The set key map generates a touch event corresponding to a key according to the user's touch, and then provides the generated touch event to the controller. Then, the controller 160 performs a control operation to output a numeral or letter corresponding to the provided touch event on the display unit.

Meanwhile, in an exemplary embodiment of the present invention, when numerals output on the display unit correspond to the telephone number of a specific device, the portable device is controlled to output icons corresponding to the respective devices in the form of images on the display unit 130, as shown in a screen 203. Here, the portable device illustrates providing an auto-complete function, which searches phone book information when a partial phone number has been input and automatically outputs a telephone number including the input numeral or numerals, wherein the portable device outputs the screen 203 directly when a corresponding telephone number is selected. Also, the portable device may output the screen 203 directly when the user selects another device based on the phone book information. More specifically, the portable device outputs an icon corresponding to the portable device itself, i.e., an icon which has a round edge and is marked therein with the letter "I" indicating the portable device itself, and outputs an icon corresponding to device "A," i.e., an icon which has a coin-shaped edge and is marked with the letter "A" therein. In this case, the portable device displays icon "I" and icon "A" separated by a predetermined distance from each other so as to indicate that the two devices are not yet in a call-connected state.

Thereafter, when the user of the portable device desires to make a call connection to a user of the other device indicated by icon "A," the user of the portable device performs a touch selected from the set of touch, double-touch, or touch and drag icon "A" to icon "I." When icons "A" and "I" are relocated in accordance with the a selection from the set of positions comprising within a predetermined interval of each other, contacting with each other, and overlapping each other, the portable device activates a radio frequency to make a call connection with the other device corresponding to icon "A." In addition, in order to represent one state of the set of a call connection is being attempted and a call connection has been achieved, the portable device performs a control operation such that icon "A" and icon "I" are located within a predetermined distance from each other and are displayed on the display unit 130.

Meanwhile, when the user of the portable device activates a "call" key included in a keypad or a key map after inputting a telephone number or pointing to another device in phone book information stored in the storage unit 150 of the portable device, the portable device performs an operation to make a call connection to the other device (hereinafter, referred to as device "A") corresponding to icon "A." That is, when the "call" key is pressed, the portable device activates the radio frequency unit, and transfers a message of requesting a call connection to be made with device "A" to device "A" via a base station. At the same time, the portable device performs a control operation such that icon "I" and icon "A" are located within the predetermined distance from each other and are displayed, as shown in the screen 203.

In addition, the portable device performs a control operation such that icons, e.g., a "speakerphone" icon and an "end" icon, corresponding to options of the call function of the portable device, are output on one side of the display unit. The "speakerphone" icon and "end" icon are each classified as a function icon, the speakerphone icon supporting a change of an audio signal output path.

In a call-connected state with device "A," when the portable device receives a call request from another device (hereinafter, referred to as portable device "B") corresponding to "B" that represents one of an index and a specific telephone number, the portable device performs a control operation such that icon "B" corresponding to the "B" is output on the display unit, as shown in a screen 205. In this case, since device "B" corresponding to icon "B" is not in a call connection with the portable device, the image of icon "B" is displayed at a location spaced by a predetermined distance from icon "I" so as to represent that a call connection is not achieved between the portable device and device "B."

Meanwhile, when the user of the portable device desires to make a call connection with device "B" while being in a call-connected state with portable device "A," the user performs touch and drag of icon "B" such that one of the actions is performed by the portable device selected from the group of actions, for example, icon "B" moves to an area within a predetermined distance from icon "I," icon "B" is in contact with icon "I," and icon "B" is overlapped on icon "I." According to a touch operation by the user, the portable device performs a control operation to make a call connection with device "B." In this case, the portable device performs a control operation to shift the call-connected state with portable device "A," into a hold state.

At the same time, while controlling icon "B" to be displayed within a predetermined distance from icon "I," the portable device controls icon "A" to be displayed at a position spaced by a predetermined distance from icon "I" so as to indicate that icon "A" is in a hold state, as shown in screen 207. In this case, after icon "B" is moved to icon "I", icon "B" is changed to have at least one of a size, color, and shape which has been preset to indicate a call-connected state, and icon "A" is changed to have at least one of a size, color, and shape which has been preset to indicate a hold state. In addition, when moving icon "B" to icon "I," the portable device controls icon "A" to be automatically spaced by a predetermined distance from icon "I" and to be thus displayed.

As described above, the user interface according to exemplary embodiments of the present invention outputs icons corresponding to devices on the display unit 130, and sets up a touch sensor unit for movement, disposition, and removal of the output icons thereon. In addition, the user interface generates input signals for performing a call function according to the movement, disposition, and removal of the icons.

Although the aforementioned description has been given for a case where the image of each icon has a circular shape, and a specified initial or text is marked within each icon, the present invention is not limited to the aforementioned icons' shape and/or specification. That is, icons according to the present invention may have various shapes, including a polygonal shape, a three-dimensional polygonal shape, and a spherical shape, and information marked in each icon may vary according to users' intention or setting, as well. Also, the icons may have a predetermined color, or may have different colors depending on call connection states of added icons. In addition, the size, color, and shape of at least one among the icons, including icon "I", icon "A", and icon "B," may be changed to a size, color, or shape which has been preset to distinguish between a state before a call connection and a state after a call connection.

Figure 3:
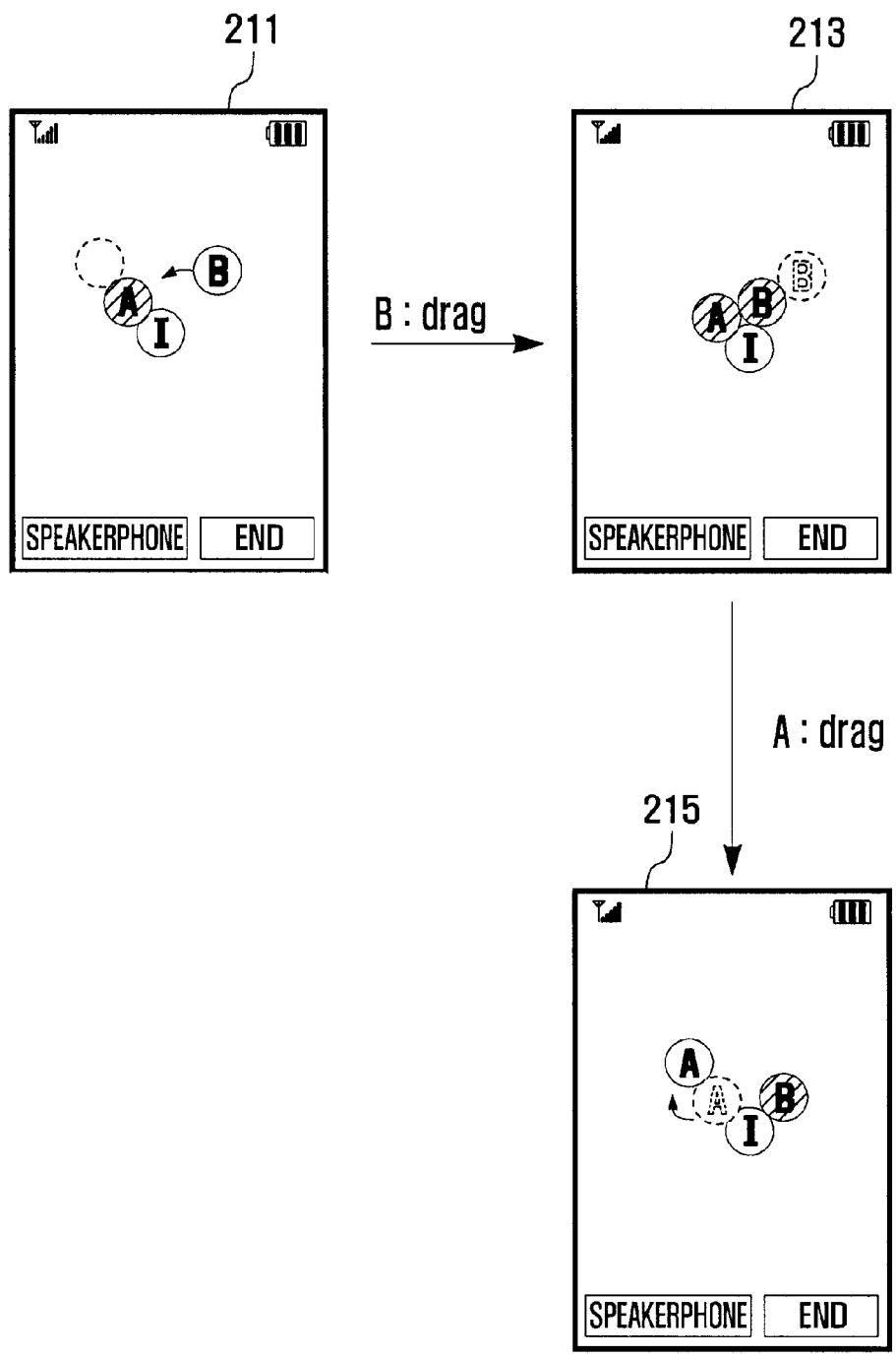
FIG. 3 is a view illustrating a screen for explaining a multipoint call function according to an exemplary embodiment of the present invention.

FIG. 3 is a view illustrating a user interface for performing a multipoint call connection function according to exemplary embodiments of the present invention.

Referring to FIG. 3, a screen 211 illustrates a case where a portable device is in a call-connected state with device "A" corresponding to icon "A," and receives a call connection request from device "B" corresponding to icon "B." Here, in order to enable optional functions, e.g., a speakerphone function and an end function, of a call function to be performed, the portable device performs a control operation to output a "speakerphone" icon and an "end" icon on one side of the display unit.

Meanwhile, in order to perform a multipoint call, the user of the portable device performs touch and drag icon "B" to an area within a predetermined distance from icon "A" and icon "I," as illustrated in screen 213. Then, the portable device determines the final location resulting from the movement of icon "B." When icon "B" is located within the predetermined distance from both icon "A" and icon "I," or is disposed at a position where icon "B" is in contact with or overlapped on both icon "A" and icon "I," the portable device performs a control operation to perform a multipoint call connection with device "B" corresponding to icon "B." Icon "A" and icon "B" may have the same color and/or shape that represents a call-connected state.

Next, while performing a multipoint call with devices "A" and "B" corresponding to icon "A" and "B," respectively, the user of the portable device may request the connection with portable device "A" to be released. To this end, the user of the portable device selects icon "A" in the screen 213, and drags icon "A" in a predetermined direction, e.g., in a direction away from icon "I," as shown in a screen 215. Then, the portable device performs a control operation to shift a call connection state with icon "A" into a hold state. In this case, the portable device changes the image of icon "A" so as to indicate the hold state, which is the current state of icon "A." Alternatively, when the user of the portable device touches icon "A" intending to disconnect therefrom and then drags or flicks icon "A" in a direction away from icon "I," icon "A" is automatically moved and disposed at a first position where icon "A" has been located before moving towards icon "I." Meanwhile, icon "B" maintains its appearance representing a call-connected state. The portable device performs a control operation such that a call state with portable device "A" is not maintained in a hold state but is released (disconnected).

FIG. 4 is a view illustrating a user interface for explaining a control according to a call request upon a multipoint call connection according to an exemplary embodiment of the present invention.

Referring to FIG. 4, a screen 221 shows a state in which the display unit of a portable device is in a multipoint call with device "A" corresponding to icon "A," device "B" corresponding to icon "B," and device "C" corresponding to icon "C," and receives a call request from device "D" corresponding to icon "D." Therefore, the display unit of the portable device outputs icon "I" representing the portable device itself, icon "A," icon "B," and icon "C" such that icon "A," icon "B," and icon "C" are disposed within a predetermined distance from icon "I," or are in contact with icon "I." In addition, the display unit outputs icon "A," icon "B," and icon "C" with the same color indicating that corresponding devices are in the same multipoint call. In this case, in order to indicate a non-call-connected state with respect to the image of icon "D," the portable device outputs icon "D" to be disposed at a position spaced by a predetermined distance from icon "I."

In such a state, when desiring to make a call connection with device "D" corresponding to icon "D," the user of the portable device controls icon "D" to be disposed within a predetermined distance from icon "I" by touching and dragging icon "D," as shown in screen 223.

Then, icon "D" may be changed to have a color or shape indicating that device "D" is in a call-connected state. Meanwhile, when icon "D" is disposed within a predetermined distance from icon "I," the portable device performs a control operation such that icons "A," "B," and "C" in contact with icon "I," as shown in the screen 221, are spaced by a predetermined distance from icon "I." In this case, the portable device changes at least one of the color and shape of icons "A," "B," and "C" to a color and shape indicating that the call connection is in a hold state. In this case, the portable device performs one of disposing icons "A," "B," and "C" to be located within a predetermined distance from each other and to be in contact with each other for the sake of indicating that devices corresponding to icons "A," "B," and "C" are in a multipoint call of the same group. Accordingly, the user of the portable device can intuitively recognize that the portable device has been in a multipoint call with devices "A," "B," and "C" corresponding to icons "A," "B," and "C," devices "A," "B," and "C" are currently in a hold state, and the portable device is in a call-connected state with device "D" corresponding to icon "D." Thereafter, when the user of the portable device touches and drags at least one among icons "A," "B," and "C" to icon "I" in order to again connect the multipoint call, the portable device control icons "A," "B," and "C" to one of approach icon "I" or to be in contact with icon "I" at the same time, and simultaneously controls icon "D" to be displayed at a position spaced by a predetermined distance from icon "I." As described above, the portable device controls a hold state and one of a call or a multipoint call to change the positions of the icons in a toggle way based on the disposition of the icons.

Meanwhile, in a state where the portable device has been in a call-connected state with device "D" corresponding to icon "D," when the portable device makes a multipoint call with devices "A," "B," and "C" corresponding to icons "A," "B," and "C," icon "D" may be maintained in a hold state.

Figure 5:
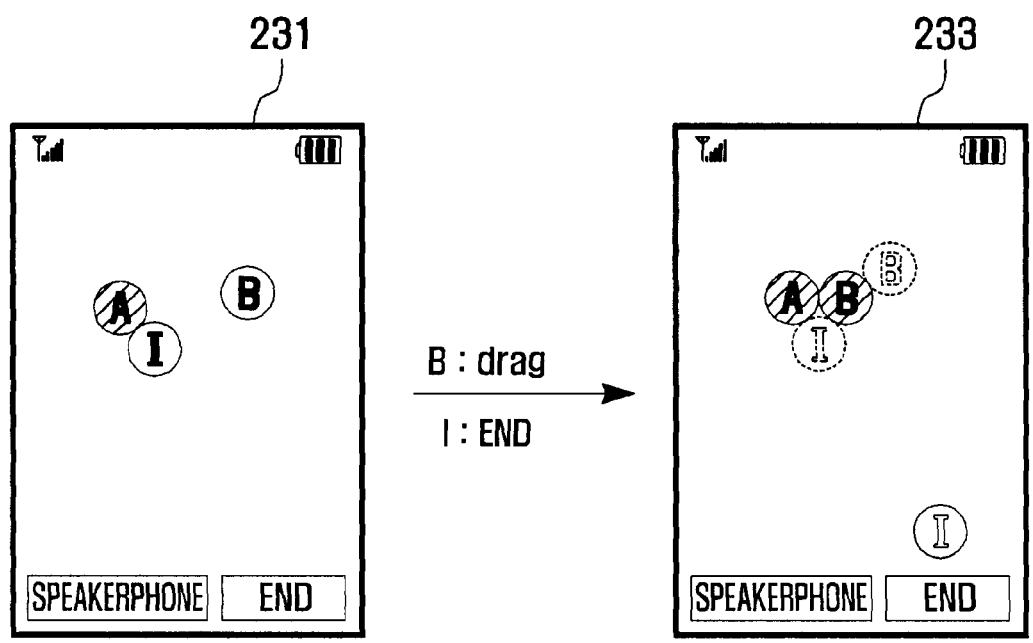
FIG. 5 is a view illustrating a screen for explaining a call relay function between other devices according to an exemplary embodiment of the present invention.

FIG. 5 is a view illustrating a user interface for illustrating a call relay function control according to an exemplary embodiment of the present invention.

Referring to FIG. 5, a screen 231 illustrates a case where, while a portable device is in a call-connected state with device "A" corresponding to icon "A," the portable device receives a call request from device "B" corresponding to icon "B." Alternatively, the screen 231 illustrates a case where, while the portable device is in a call-connected state with device "B" corresponding to icon "B," the portable device receives a call request from device "A" corresponding to icon "A," changes the call connection state with device "B" corresponding to icon "B" to a hold state, and makes a call connection with device "A" corresponding to icon "A." In addition, in order to support optional functions, e.g., a speakerphone function and an end function of a call function, the portable device performs a control operation to output a "speakerphone" icon and an "end" icon on one side portion of the display unit.

In this state, in order to perform a multipoint call with devices "A" and "B" corresponding to icons "A" and "B," the user of the portable device drags and disposes icon "B" to be in contact with both icon "A" and icon "I" at the same time. Accordingly, the display unit of the portable device outputs icons "A" and "B" to be in contact with each other, and also to be in contact with icon "I," as shown in a screen 233.

Thereafter, the user of the portable device may touch and drag icon "I," which has been in contact with both icons "A" and "B," to contact icon "I" with the "end" icon or to overlap at least a part of icon "I" on the "end" icon. Otherwise, the user of the portable device may drag the "end" icon to contact the "end" icon with icon "I" or to overlap at least a part of the "end" icon on icon "I." Accordingly and in response to user action, the portable device relays a call connection between devices "A" and "B" corresponding to icons "A" and "B," respectively, and can be released from the multipoint call. Thereafter, the portable device performs a control operation to output icons "A" and "B" during a predetermined period of time, and then to output a preset screen, e.g., a stand-by screen, in accordance with a call release.

Meanwhile, when the user of a portable device moves icon "I" so as to contact icon "I" with the "speakerphone" icon, or to overlap at least a part of icon "I" on the "speakerphone" icon, an audio path is changed. That is, in a state in which the portable device outputs audio signals transferred from devices "A" and "B" corresponding to icons "A" and "B" through an ear speaker, i.e. a speaker which is provided on the body of the portable device so as to be located a position corresponding to an ear of the user upon a call, when the user moves icon "I" to the "speakerphone" icon so as to contact the images of the icons with each other or to overlap at least parts of the images each other, the portable device performs a control operation to change the output path of audio signals so that the audio signals can be output through a speakerphone, which enables the user to listen to the audio signals although the portable device is spaced by a predetermined distance from the ears of the user. In this case, the user of the portable device may move the "speakerphone" icon so that the "speakerphone" icon is in contact with icon "I" or at least a part of the "speakerphone" icon is overlapped on icon "I," instead of moving icon "I."

Figure 6:
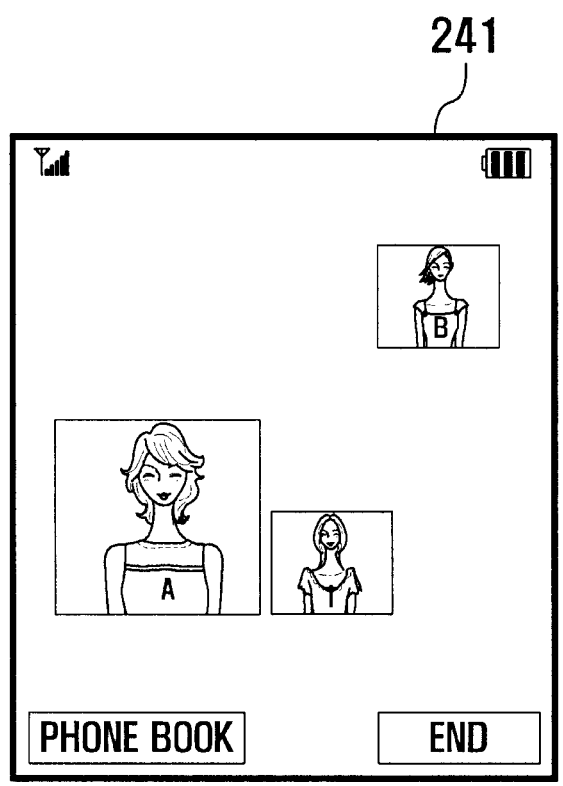
FIG. 6 is a view illustrating a screen for explaining a video call function according to an exemplary embodiment of the present invention.

FIG. 6 is a view illustrating a user interface for supporting a video call function according to an exemplary embodiment of the present invention.

Referring to FIG. 6, a screen 241 shows a case where the user of a portable device is in a video call state with the user of another portable device (hereinafter, referred to as portable device "A") corresponding to icon "A." To this end, the user of the portable device transmits a video call request message for requesting a video call connection to device "A" corresponding to icon "A" via a base station. When device "A" corresponding to icon "A" responds to the video call request message, the portable device forms a video call channel with device "A" corresponding to icon "A," and activates a camera of the portable device, thereby transmitting/receiving collected images to/from portable device "A", respectively. Accordingly, the portable device outputs an image received from device "A" corresponding to icon "A" on one side of a display unit, and outputs an image collected through the camera provided in the portable device on another side of the display unit. In this case, the portable device may replace icon "A" with the image received from device "A," wherein the portable device may output predetermined text information, e.g., the letter "A," within the image received from device "A." In order to more easily recognize the user of device "A," the portable device may perform a control operation to display the image received from device "A" with a larger size than the size of the image obtained through the camera of the portable device. Also, in order to express that device "A" is in a call-connected state with the portable device, the portable device may output its own image and the image received from device "A" so that the images are mutually in contact or are located within a predetermined distance from each other.

Meanwhile, when receiving a video call request from a portable device, i.e. a third device (hereinafter, referred to as device "B"), other than device "A," the portable device performs a control operation to output an image received from device "B", which requests the video call, in distinction with the other images on the display unit. That is, the portable device may mark a specified letter, e.g., "B," within the image received from device "B" which requests the video call; and may allow image "B," which is an image marked with the letter "B," to have a color or brightness and shade different from those of the other images for the sake of expressing that a corresponding device is currently in a video call request state. In addition, the portable device may perform a control operation to output image "B" at a position spaced by a predetermined distance from image "I" which is the image for the portable device. Also, the portable device may display image "B" to have a size smaller than that of image "I" for the portable device itself and than that of image "A," which represents device "A" being currently connected in a video call state.

The following procedure may be progressed in a manner similar to the aforementioned procedure performed upon a voice call request. That is, when the user of the portable device desires to make a video call with device "B" corresponding to image "B," the user performs an action selected from the group consisting of touch, drag, and dispose image "B" so that image "B" is one of is close by image "I," is in contact with image "I", and is overlapped on at least a part of image "I." Accordingly, the portable device performs a control operation to form a video call channel with device "B" corresponding to image "B," and to change the call state with device "A" corresponding to image "A" to a hold state. In this case, in order to distinguish between calling and called devices the portable device performs a control operation to output image "B" after enlarging the size of image "B," with which a video call channel is newly formed, to the previous size of image "A." In addition, the portable device performs a control operation to output image "A" after reducing the size of image "A" to the previous size of image "B." Also, the portable device performs a control operation to space reduced image "A" by a predetermined distance from image "I."

Meanwhile, similarly to the user interface supporting a voice call function, the user interface supporting the video call function performs a control operation such that icons, e.g., a "phone book" icon and an "end" icon, supporting optional functions of a call are output on one side of the display unit.

In addition, when the user of the portable device desires to make a multipoint call based on a video call, that is, when the user disposes image "B" at a position where image "B" can be put in contact with or can be at least partially overlapped on both image "A" and image "I" in a state in which image "A" and image "I" are in contact with each other, the portable device determines a video-call-based multipoint call to be performed, forms a video call channel with each of devices "A" and "B," and performs a control operation to output image "A" and "B" having the same size. Further, upon a multipoint call, the controller performs a control operation such that the images are output uniformly throughout a screen partition.

As described above, the user interface according to exemplary embodiments of the present invention supports call connection states to be displayed as icons corresponding to the respective devices wherein devices "A", "B", "C", "D" may be portable or other devices (land lines), and the touch sensor unit is set up so that the icons can be moved, disposed, and removed according to the user's touch, so that various call functions can be rapidly and easily used, and the user can intuitively recognize the current call state. In addition, since the user interface according to the present invention can be applied to a video call in a similar way, the convenient call interface of the present invention can be provided to a video call, as well as a voice call.

Meanwhile, although exemplary embodiments of the present invention have been described in detail hereinabove, it should be clearly understood that many variations and modifications of the basic inventive concepts herein described, which may occur to those skilled in the art, will still fall within the spirit and scope of the present invention as defined in the appended claims.

As described above, according to the user interface for supporting a call function and the portable device using the user interface, provided by the present invention, it is possible to rapidly and easily process various functions required for the call function, and it is possible to easily use the call function.

What is claimed is:

1. A portable device for supporting a call function, the portable device comprising:
   a radio frequency unit for performing a call connection between the portable device and at least a second device;
   a controller for controlling the call connection;
   an input unit for inputting a telephone number corresponding to the second device which makes a call connection through the radio frequency unit, and for generating an input signal to select phone book information associated with the second device;
   a display unit for outputting a first icon corresponding to the portable device itself and displayed on a user interface, and for outputting on the user interface, during a current call connection with a second device, a second icon representing the second device, the first and second icons being displayed overlapping or substantially touching to represent the current call connection;
   wherein in response to detecting an incoming call from a third device during the current call, the controller causes the user interface to display a third icon representing the third device at a location separated from each of the first and second icons; and
   during a state of receiving the incoming call, in response to detecting a single, predetermined user gesture involving only the first and third icons among all displayed icons, the controller controls an operation of automatically call-connecting the portable device and the third device and adjusting a relative position between the first and third icons so that they overlap or substantially touch to indicate a call-connected state therebetween, while automatically separating the second icon from the first icon on the user interface to indicate a hold state and placing the second device on hold with the portable device.

2. The portable device as claimed in claim 1, further comprising a camera for collecting an image upon an image call connection, wherein the controller replaces at least one of the first and second icons by one of a transmitted and a received image upon a video call connection.

3. The portable device as claimed in claim 2, wherein the controller performs a control operation such that the second icon is displayed differently when in a call-connected state than a hold state, with the second icon displayed differently in at least one of size, color, and shape.

4. The portable device as claimed in claim 2, wherein, upon a multipoint call, the controller performs a control operation such that the images are output uniformly throughout a screen partition.

5. The portable device as claimed in claim 1, wherein the controller performs a control operation to change at least one of size, shape and color of the icons depending on a change in a distance between the icons.

6. The portable device of claim 1, wherein the single, predetermined user gesture is a touch and drag gesture from the third icon towards the first icon.

7. The portable device of claim 1, wherein:
with the third icon displayed separated from each of the first and second icons in response to detecting the incoming call, in response to detecting a user gesture involving only the second and third icons among all displayed icons, in response, the controller call-connects the third device with each of the first and second devices in a conference call and causes displaying the third icon overlapping or substantially touching each of the first and second icons.

8. The portable terminal of claim 7, wherein the user gesture involving only the second and third icons is a touch and drag gesture from the third icon towards the second icon.

9. A method in a portable communication device having a display, the method comprising:
during a current call connection with a second device, displaying on the display a first icon representing a user of the portable device and a second icon representing the second device, the first and second icons being displayed overlapping or substantially touching to represent the call connection;
in response to detecting an incoming call from a third device during the current call, displaying a third icon representing the third device at a location separated from each of the first and second icons; and
during a state of receiving the incoming call, in response to detecting a single, predetermined user gesture involving only the first and third icons among all displayed icons, automatically call-connecting the portable device and the third device and adjusting a relative position between the first and third icons so that they overlap or substantially touch to indicate a call-connected state therebetween, while automatically separating the second icon from the first icon to indicate a hold state and placing the second device on hold with the portable device.

10. The method of claim 9, wherein the single, predetermined user gesture is a touch and drag gesture from the third icon towards the first icon.

11. The method of claim 9, further comprising:
with the third icon displayed separated from each of the first and second icons in response to detecting the incoming call, detecting a user gesture involving the second and third icons among all displayed icons, and in response, call-connecting the third device with each of the first and second devices in a conference call and displaying the third icon overlapping or substantially touching each of the first and second icons.

12. The method of claim 11, wherein the user gesture involving only the second and third icons is a touch and drag gesture from the third icon towards the second icon.

13. The method of claim 9, wherein at least one of the first icon, the second icon, and the third icon is changed in at least one of shape and color depending on a change in a distance between the first and second icon, between the first and third icon, or between the second and third icon.

14. The method of claim 9, wherein at least one of the first and second icons is replaced by a transmitted/received image upon a video call connection, and
an icon in a call-connected state and an icon in a hold state are displayed differently in at least one of size, color, and shape.

15. The method of claim 14, wherein, upon a multipoint call, images corresponding to a plurality of second icons are output uniformly throughout a screen partition.

16. The method of claim 9, further comprising displaying a first function icon for supporting a change of an audio signal output path, and a second function icon for supporting a call end.

* * * * *